United States Patent Office 3,044,521
Patented July 17, 1962

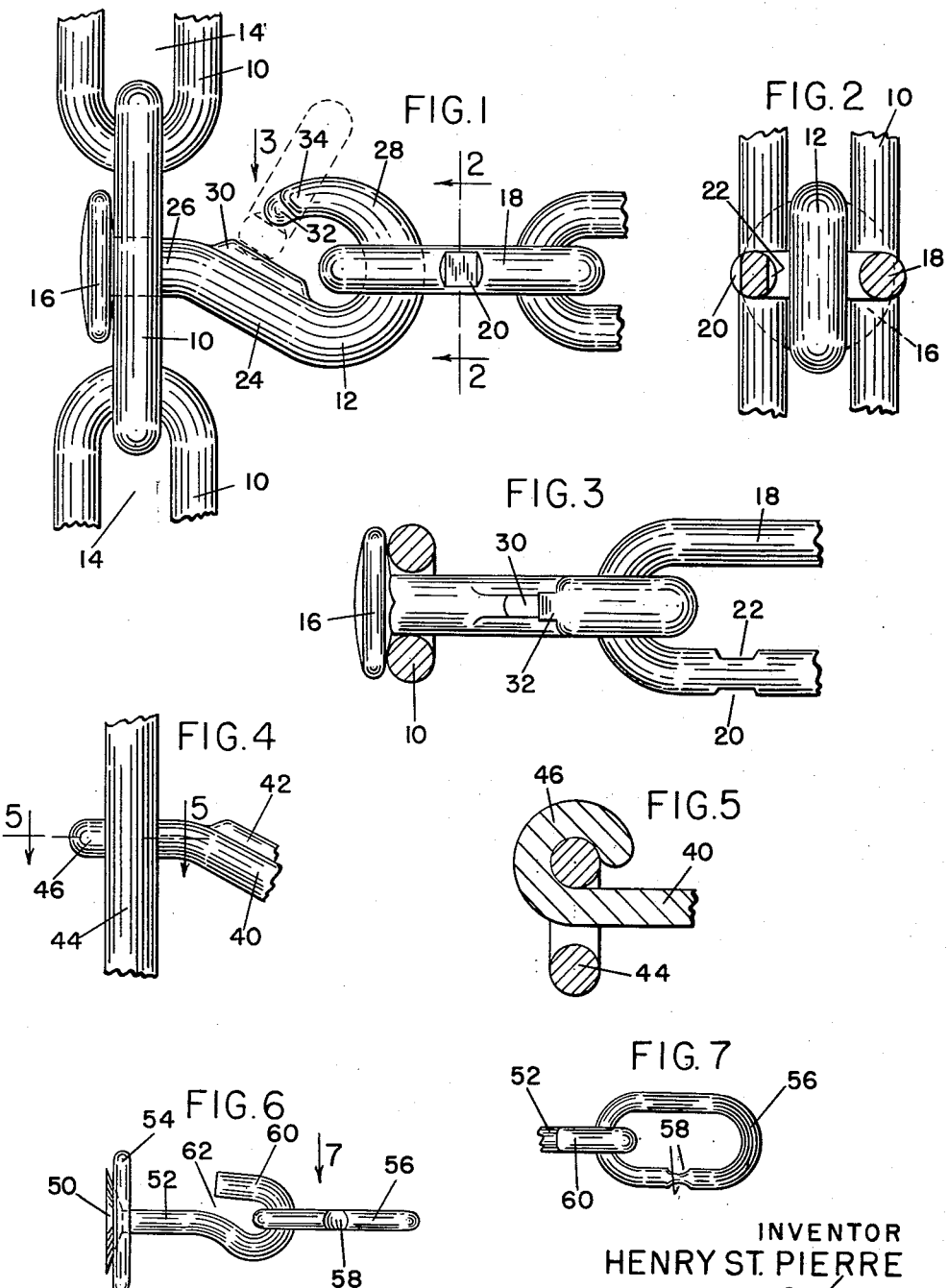

3,044,521
SWIVEL HOOK AND CHAIN FOR TIRE CHAINS
Henry St. Pierre, 50 Frank St., Worcester, Mass.
Filed Dec. 22, 1960, Ser. No. 77,581
7 Claims. (Cl. 152—241)

This invention relates to a new and improved tire chain and particularly to a new combination of hook means for securing the cross chains to the side chains. Reference is made to my copending application Serial No. 797,748, filed March 6, 1959.

The principal object of the present invention resides in the provision of a swivel or other type of hook particularly adapted for either twisted link or flat link cross chains in the manner of my Patent No. 2,950,750, and including an end link in the cross chain which is provided with a restricted portion for cooperation with a complementary ridge portion between the extreme end of the hook and the opposite point on the shank thereof, by which the chains may be assembled or disassembled without the use of tools; the provision of the same construction above recited including a swivel hook; the provision of the same construction above recited in which the hook is secured to the side chain in the usual manner or by means of another hook bent around the side chain link; and the provision of a swivel hook or the like type of connector between the side chains and the cross chains whereby the swivel hook may be if desired bent down to form a restricted closure for the end link of the cross chain.

Other objects and advantages of the invention will appear hereinafter.

Reference is to be had to the accompanying drawings, in which

FIG. 1 is a plan view illustrating the manner of assembling the cross chain to the side chain;

FIG. 2 is a section on line 2—2 of FIG. 1;

FIG. 3 is a view in elevation, looking in the direction of arrow 3 in FIG. 2;

FIG. 4 is a view in elevation showing a modification;

FIG. 5 is a section on line 5—5 of FIG. 4;

FIG. 6 is a view in elevation showing a further modification; and

FIG. 7 is a plan view, looking in the direction of arrow 7 in FIG. 6.

In carrying out the present invention, the side chain is generally indicated at 10 and comprises the usual links which are shown here as flat. There is provided a swivel hook generally indicated at 12 and this swivel hook may be passed through the opening of one of the links 10, such opening being indicated at 14 as to certain of the links 10 in FIG. 1. The swivel hook has a base on it which is indicated at 16 and this base is wider than the opening of the links 10 as clearly shown in FIG. 3, so that the showing of the swivel hook 12 in FIG. 1 is in its extreme position after it has been passed from left to right through the opening in the link 10.

The hook 12 is provided with a bight which receives the end link 18 of the cross chain. It is preferred that these cross chains should be flat as shown in my aforementioned patent, but the invention also contemplates twisted links as well, as will be clear to those skilled in the art.

The end link 18 at each end of the cross chain is provided with a restricted portion which is here indicated at 20. This restricted portion may appear at one side only of the side run of link 18, or it may appear at both sides thereof as indicated at 22, see FIGS. 2 and 3. Furthermore, both side runs of the link 18 may be provided with a restricted portion or it may appear at only one side thereof as shown.

The shank of the hook 12 is indicated at 24 and it will be seen that it is preferred that it be inclined with respect to the stud at 26 upon which the head 16 appears. This shank has the bight as shown and the hook portion thereof 28 which extends around into closely spaced proximity from the inclined portion of the shank 24. The inclined portion of the shank 24 is provided with a narrow central raised ridge 30 which lies opposite a restricted portion 32 on the nose 34 of the end of the hook 28. The portions 32 and 30 act as guide means for receiving the restricted portions 20 and 22 in the side run of the end link 18 of the cross chain. This action is clearly shown in dotted lines in FIG. 1 of the drawings wherein it is seen that by aligning the restricted portions 20 and 22 of link 18 with the raised ridge 30 at the restricted portion 32 on the nose 34, the link 18 may be slid in-and-out of the bight of the hook 12. On the other hand, it is extremely unlikely that once assembled the parts will become arranged in the precise fashion for accidental disassembly thereof, even when the chain is assembled and then put in a bag or box for transportation or storage. After the chains are assembled on the tire, such a disassembling action is virtually impossible.

In addition, however, in the invention as shown in FIG. 1, the hook is swivelly mounted with respect to the side chain 10 and as pointed out in my above mentioned patent there are certain advantages derived from this construction, and it will be appreciated that the end link 18 is always in the position shown in FIGS. 1 and 3 when assembled to the tire casing.

If desired, the invention can also be applied to a non-swivelling hook such as indicated in FIGS. 4 and 5 where the shank of the hook is indicated at 40, the raised ridge at 42, but in this case instead of having a swivel head 16, the shank of the hook at 40 is bent over the run 44 of the side chain as shown at 46.

Also the invention can be applied to a wire type of swivel hook which is illustrated in FIGS. 6 and 7 wherein a piece of wire is headed as at 50 to provide a swivel head similar to that at 16 and the parts are assembled as shown in FIG. 6 with the shank of the hook at 52 passing through the link of the side chain at 54. The end link of the cross chain is indicated at 56 and it has a restricted portion 58 which appears at either or both sides thereof, see FIG. 7. This restricted portion can be made merely by an indentation or can actually be milled out. In any event, the hook has a bight which forms the hook portion thereof as at 60 and there is an opening 62 by which means the restricted portion at 58 of the link 56 may be assembled and disassembled. In this case, the indentations at 58 are generally complementary to the curvature of the wire forming shank 52 and the nose 60 of the hook, but the action is generally the same as above described with respect to the form of the invention shown in FIGS. 1 to 3 inclusive.

Having thus described my invention and the advantages thereof, I do not wish to be limited to the details herein disclosed, otherwise than as set forth in the claims, but what I claim is:

1. The combination with a tire chain having side chains and cross chains, of a hook comprising a bight portion terminating in an end, a shank adapted to extend through a link of the side chain, a raised ridge on the shank and a restricted portion on an end link of the cross chains the raised ridge extending along the shank directly under the end of the hook bight portion end, the restricted portion being complementary to the distance between the raised ridge on the shank and the end of the hook, the hook end approaching the shank, so that the side chains and cross chains may be assembled by sliding the restricted portion of the end link of the cross chain complementary to the raised ridge portion into the bight of the hook.

2. The combination of a tire chain as recited in claim 1 and including a restricted portion on the extreme end of the hook, said restricted portion being complementary to a depressed portion on the side run of the end link of the cross chain, said depressed portion being generally aligned with but at the other side of said cross link run from the aforementioned restricted portion.

3. The combination of a tire chain as recited in claim 1 wherein said hook is a swivel hook and includes a swivel button type head, said swivel hook being assembled to a link of the side chain by being passed therethrough at the hook bight portion thereof, said swivel button head being too large to follow through the opening between the runs of the links of the side chain.

4. The combination of claim 1 wherein said hook is provided with means for attachment to a link of the side chain.

5. In combination, a swivel hook for connecting the side chains and cross chains of tire chains, said hook comprising a wire shank and an integral wire hook, said shank and hook being of uniform section and said hook having a substantially square cut off end, said hook being reversely turned down to approach said shank portion but there being a space between the hook at the square cut off end and the shank, and a wire end link of a cross chain, said end link of the cross chain being provided with a notch complementary to and generally fitting the opening between the shank and the square cut off end of the hook for assembly and disassembly thereof, the space being less in width than the diameter of the wire of the end link.

6. The combination as set forth in claim 5 including a swivel button arrangement for assembly of the hook to a link of a side chain.

7. The combination as set forth in claim 5 including means for substantially permanently connecting the hook ot the side chain.

References Cited in the file of this patent
UNITED STATES PATENTS

| | | |
|---|---|---|
| 1,456,931 | Parker | May 29, 1923 |
| 2,770,281 | Eddy | Nov. 13, 1956 |